(12) United States Patent
Swinkels

(10) Patent No.: US 7,883,886 B2
(45) Date of Patent: Feb. 8, 2011

(54) DEVICE FOR CEREAL MALTING

(75) Inventor: Gerardus Swinkels, Aarle Rixtel (NL)

(73) Assignee: Buehler AG, Uzwil (CH)

( * ) Notice: Subject to any disclaimer, the term of this patent is extended or adjusted under 35 U.S.C. 154(b) by 853 days.

(21) Appl. No.: 10/559,671

(22) PCT Filed: Jul. 8, 2004

(86) PCT No.: PCT/CH2004/000435

§ 371 (c)(1),
(2), (4) Date: Dec. 6, 2005

(87) PCT Pub. No.: WO2005/005592

PCT Pub. Date: Jan. 20, 2005

(65) Prior Publication Data

US 2006/0134776 A1 Jun. 22, 2006

(30) Foreign Application Priority Data

Jul. 9, 2003 (NL) .................................... 1023868

(51) Int. Cl.
*C12C 1/15* (2006.01)
*C12C 7/06* (2006.01)

(52) U.S. Cl. .................. 435/291.4; 34/209; 34/211; 34/213; 34/218; 34/224

(58) Field of Classification Search ............. 435/291.4; 426/18, 28; 34/218, 224, 211, 209, 213
See application file for complete search history.

(56) References Cited

U.S. PATENT DOCUMENTS 915,968 A    3/1909  Kirkpatrick 2,933,435 A * 4/1960 Graff et al. ............... 435/291.1
3,730,846 A * 5/1973 Neubert .................... 435/291.3
3,849,255 A * 11/1974 Schlimme et al. ........ 435/291.3

FOREIGN PATENT DOCUMENTS

| DE | 17932   | 5/1882  |
|----|---------|---------|
| DE | 732739  | 3/1943  |
| DE | 2121586 | 11/1972 |

* cited by examiner

*Primary Examiner*—William H Beisner
*Assistant Examiner*—Danielle Henkel
(74) *Attorney, Agent, or Firm*—Greenblum & Bernstein P.L.C.

(57) ABSTRACT

The invention relates to a device (1) for malting cereals comprising a tower (2) consisting a certain number of stories which are separated from each other by storey floors (9, 10), each storey comprising an air-proof carrier plate (13) carrying germinating cereals (24). Said tower also comprises air conditioning means for air conditioning, transfer means provided with a feeding channel and a removing channel for transferring conditioned air by means of the feeding channel which extends from air conditioning means downwards to the bottom of the carrier plate, passes along said carrier plate and a cereal layer arranged thereon in a direction of the top surface of said cereal layer and exits said top surface of the cereal layer by means of the removing channel. The inventive device is characterized in that the feeding channel and/or removing channel extend through a central opening in at least one storey floor.

20 Claims, 2 Drawing Sheets

DEVICE FOR CEREAL MALTING

CROSS-REFERENCE TO RELATED APPLICATIONS

The present application is a U.S. National Stage of International Patent Application No. PCT/CH2004/000435 filed Jul. 8, 2004 and claims priority of Netherlands Patent Application No. 10 23 868 filed Jul. 9, 2003. Moreover, the disclosure of International Patent Application No. PCT/CH2004/000435 is expressly incorporated by reference herein in its entirety.

BACKGROUND OF THE INVENTION

1. Field of the Invention

The invention relates to a device for malting grain, comprising a tower with several tiers, which are separated from each other by tier floors. Each tier comprises an air-permeable carrying floor to support the grain to be germinated, along with air conditioning agents for conditioning the air and displacement elements. A supply canal and discharge canal for displacing conditioned air are provided. The conditioned air displaced via the supply canal are provided to guide from the air conditioning elements to the bottom side of a carrying floor, through the carrying floor and a grain layer lying on the carrying floor to the upper side of the grain layer, and the conditioned air displaced via the discharge canal is guided away from the upper side of the grain layer.

2. Discussion of Background Information

A generic device has been operational since 1972 at the facility of the Bavaria N.V. company in Lieshout, Netherlands. This device has a tower with annular carrying floors rotatable around an axis, which are located between two overlying tier floors. The carrying floors are supported on both the inner diameter and outer diameter. The inner diameter of the annular carrying floor measures 6 meters, while the outer diameter of the carrying floor (and tier floors) measures 20 meters. Conditioned air is supplied by way of a lockable opening in the side wall of the tower, wherein conditioned air can also exit the tower again via an opening in the side wall of the tower after a grain layer has passed on a carrying floor. Even though the tower according to prior art is technologically excellent, there is a demand for further increasing the capacity of such devices. At first glance, one logical solution would be to increase the outer diameter of the tier floor, so that a larger quantity of grain can be treated per carrying floor. From a practical standpoint, however, structural limitations make it impossible to implement this solution, wherein it increasing the outer diameter of the carrying floor obviously causes the weight of the grain layer to increase by a power of two, with the overstress length rising as well. This task combined with the fact that it is often undesired to design the carrying floors as rotatable around their perpendicular cardoid line is why a device can technically not be constructed in this way, at least not in an economically feasible way. In addition, it is generally also required from at least a structural standpoint to make the bearing structure for the carrying floors as light as possible.

SUMMARY OF THE INVENTION

The invention provides a grain malting device that can in principle be used to economically realize a significant increase in capacity and/or utilize a lighter bearing structure for the carrying floors given the same capacity. To this end, the device according to the invention includes a supply canal and/or discharge canal extending through a central opening in at least one tier floor. The invention is based on the view that the capacity of a device can be increased by enlarging the inner diameter and outer diameter of a carrying floor to the same extent in an absolute sense, so that the length of radial overstress remains constant, while a larger number of radial supports can simultaneously be used to carry the higher weight of the grain layer, which lies on the carrying floor. In addition or as an alternative, it is possible, at a more or less constant capacity requirement, to increase the outer diameter to less of an extent as the inner diameter in absolute terms, thereby reducing the length of the radial overstress, so that a lighter bearing structure can in principle be used for the carrying floors.

In addition, the length of a potentially radially oriented winch used to load or unload the carrying floor can be shortened, while the number of mixing elements normally arranged in a radial series can also be lower. Further, grain located near the inner diameter on the carrying floor can be machined more easily depending on the size of the inner diameter.

To give such a structure an economic design, at least the space within the inner diameter of a tier floor with comparable dimensions to those of the carrying floor are used according to the invention for passing through at least a portion of the supply canal and/or at least a portion of the discharge canal. Another advantage here is that no arrangements need in principle be present on the outside of the tower for supplying conditioned air to the lower side of a loaded carrying floor and/or for discharging "used" air starting from the upper side of the grain layer, even though such devices on the outside of the tower can be present within the framework of the invention, provided that the supply canal and/or discharge canal extends at least partially through the central opening.

Another advantage relative to central space utilization inside the inner diameter is achieved by having the supply canal and discharge canal extend through a central opening in at least one tier floor.

The discharge canal preferably empties out at the air conditioning element. Hence, the discharge canal serves as a return line, and at least a portion of the (conditioned) air can be circulated, which has a positive effect on energy consumption. How much conditioned air circulates can be adjusted with regulators, which set the ratio between conditioned air supplied to the air conditioning element and conditioned air discharged to the outside environment.

As an alternative to or in combination with the aforementioned preferred embodiment, the device according to the invention is preferably further characterized in that the discharge canal empties into the outside environment of the tower. If this preferred embodiment is combined with the above preferred embodiment, a branched discharge canal is preferably present, wherein a first branched portion of the discharge canal empties into the outside environment of the tower, and a second branched portion of the discharge canal empties at the air conditioning element. The space over the grain layer can here also serve as a branch, in that this space has both an opening for a return line, e.g., on the radial inside of the space, as well as a (size-adjustable) opening to the outside environment of the tower, e.g., on the radial outside of the space. A suitable valve system makes it possible to generate a desired distribution of the quantity of air routed (back) starting from the upper side of the grain layer to the air conditioning element, and which is discharged to the outside environment of the tower.

Primarily in conjunction with the circulation favorable for energy-related reasons, it is preferred that the supply canal and discharge canal, which belong to the same carrying floor, extend adjacently through a central opening in a tier floor. This makes it possible to set up a circulation loop relatively easily.

It is further preferred that the at least one central opening through which the supply canal and/or discharge canal extends is circular. Such a cross section is advantageous primarily when the carrying floor is rotatable in design according to another embodiment.

Given a circular central opening, it is preferred that the supply canal and/or discharge canal have an at least primarily segmented cross section at the location of the at least one central opening, which at the very least also connotes a blunt, segmented shape.

The advantages of the invention come to the fore primarily when the diameter of the at least one circular, central opening has a size of at least 10 meters, and further preferably of at least 12 meters. This is because, at such a diameter, the surface carries a sufficient flow to provide a number of tiers with sufficiently conditioned air.

The capacity can be increased relative to the device according to prior art by having each carrying floor be primarily annular, wherein the size of the inner diameter is at least 10 meters, preferably 12 meters.

The carrying floor here preferably has a radial overstress between the inner diameter and outer diameter of at least 7 meters, yielding an increased bearing capacity per overstress length unit relative to prior art.

The advantages to the invention are evident above all when the carrying floor can revolve around a rotational axis that extends through the cardoid line of the annular shape. If the carrying floor can rotate, the loading floor can be easily loaded or unloaded by a winch extending in a radial direction.

A compact design with limited space requirements can be obtained by arranging the air conditioning element under the level of the tier floor beneath the first carrying floor for the grain to be germinated, or by locating the air conditioning element over the level of the tier floor above the uppermost carrying floor of the tower. As an alternative or in addition, it is also possible for such devices to be present in the supply canal, provided they extend through the central opening. Primarily an adiabatic coolant is possible here, wherein water evaporation takes place.

As an alternative or in combination, it is preferred that the air conditioning element be located within the outer periphery of the tier floors to keep the device structure compact.

From a logistical standpoint, it is further preferred that another carrying floor to support germinated grain to be dried be provided under the level of the tier floor beneath the lowermost carrying floor for the grain to be germinated. This makes it possible to use gravity to easily displace germinated grain to other carrying floors, where the drying process can take place.

In terms of structural design and technological aspects, it is here preferred that the other carrying floor for the germinated grain to be dried have similar dimensions as the carrying floors for the grain to be germinated.

BRIEF DESCRIPTION OF THE DRAWINGS

The invention will be outlined in greater detail below based on the description of a preferred embodiment of the device, wherein reference is made to the figures.

DETAILED DESCRIPTION OF THE PRESENT INVENTION

Figure 1:
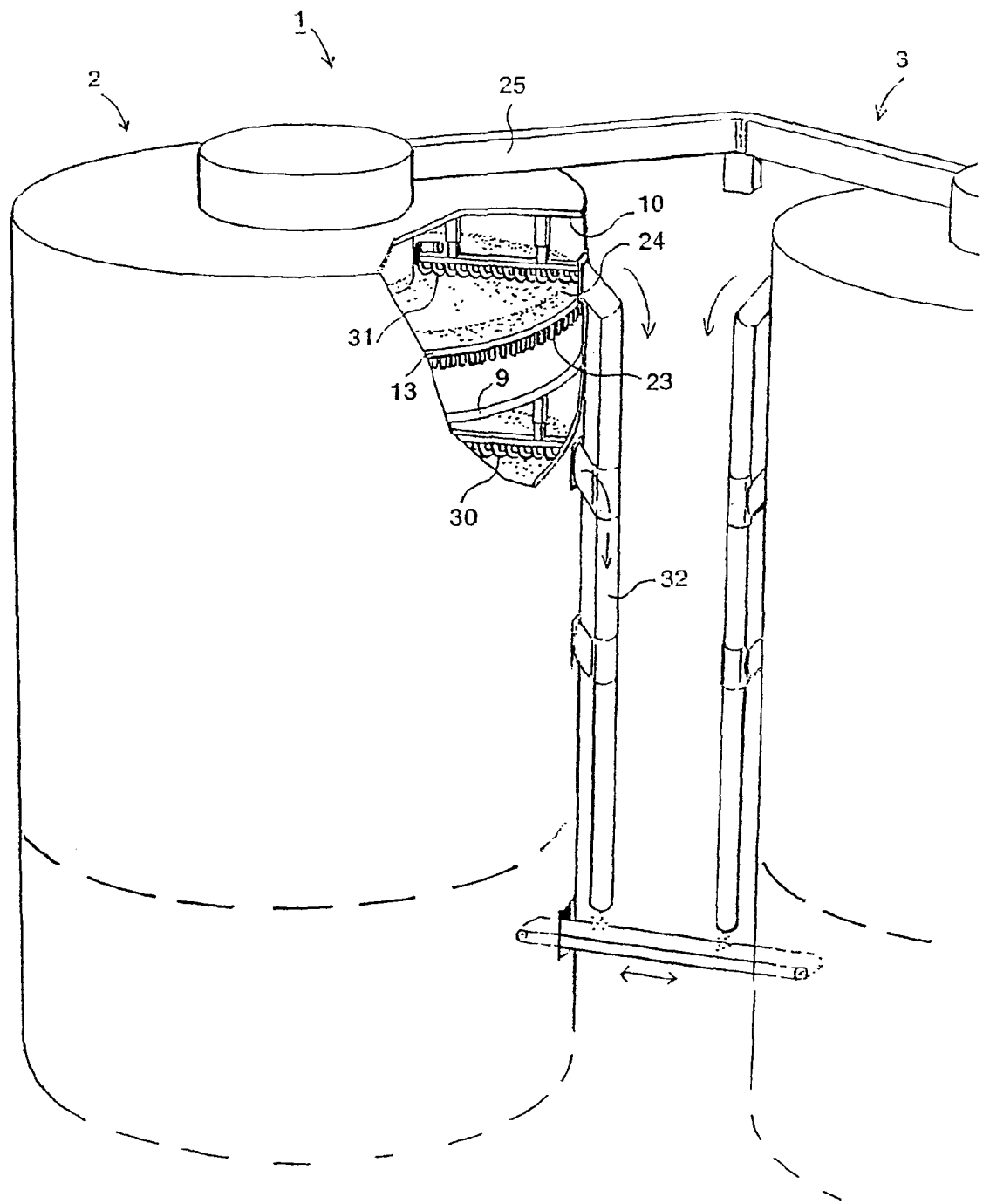
FIG. 1 shows a perspective view of a malting device according to the invention with two towers, of which only one is partially visible, and the other is partially open.
Figure 2:
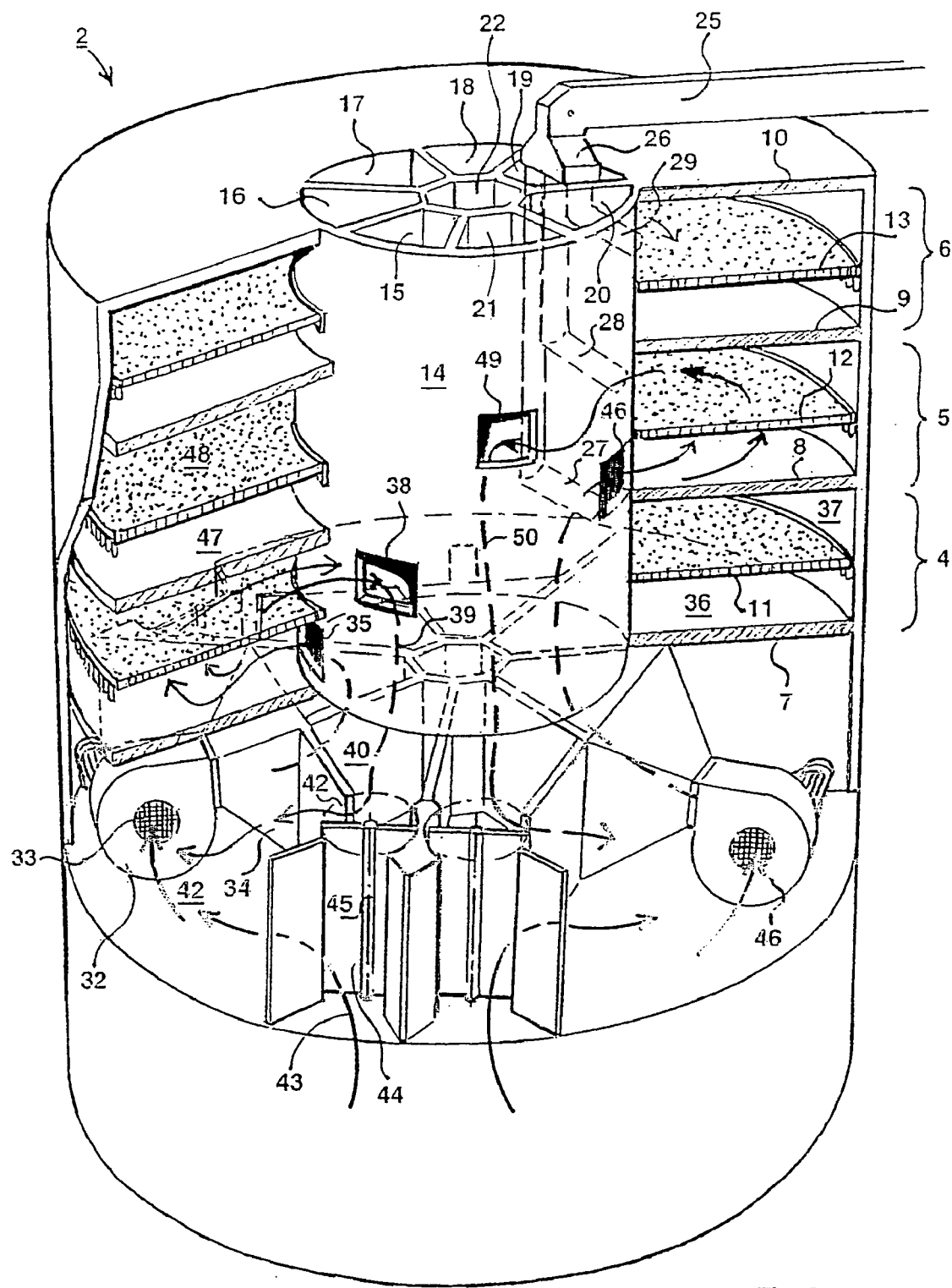
FIG. 2 shows an open and partially transparent perspective view of a tower according to FIG. 1.

FIG. 1 shows a malt factory 1 with a dual design in which two towers 2, 3 are present. FIG. 2 shows the tower 2 in detail. Tower 2 consists of three tiers 4, 5, 6, which are defined by tier floors 7, 8, 9, 10, wherein the tier floor 10 also constitutes the roof of the tower 2. Even though not applicable to this embodiment, it is conceivable to provide a soaking space on the roof where the grain is soaked prior to malting.

Situated between the corresponding tier floors 7, 8, 9, 10 are carrying floors 11, 12, 13. Both the tier floors 7, 8, 9, 10 and carrying floors 11, 12, 13 are annular, so that a cylindrical space 14 is present within the corresponding inner diameter of the tier floors and carrying floors. This cylindrical space 14 is divided into seven matching, perpendicular canals 15, 16, 17, 18, 19, 20, 21, which all are identical in shape in horizontal cross section, namely shaped like a truncated segment. Situated between the canals 14 to 21 is a central passage 22. The canals 15 to 21 extend over the entire height of the tiers 4 to 6, and are separated from each other by radial intermediate walls, which also extend to under the level 4, where air conditioning element yet to be described in greater detail are located.

The carrying floors 11, 12, 13 can be rotated around the cardoid line of the tower 2 by driving elements (not shown in any greater detail), to which end the carrying floors 11, 12, 13 are provided with guided support by rollers on both their inner diameter and outer diameter. Visible on FIG. 1 are rollers 23 on the outer diameter of the carrying floor 13. The carrying floors 11, 12, 13 are perforated in such a way that they are permeable to air on the one hand, in particular to conditioned air, but also are able to carry a layer of grain 24 to be germinated on the other.

Grain is supplied to the corresponding carrying floors 11, 12, 13 via the supply line 25 over the roof 10 of the tower 2. Even though the supply lines 25 for towers 2 and 3 together form an angle on FIG. 1, it is also conceivable, or even more advantageous, to run the two supply lines as mutual extensions, comprising a shared conveyor belt that can be driven in two opposite directions, and on which grain to be malted can be poured. The supply line 25 bends downwardly precisely over the canal 19, branching into three lines 27, 28, 29 over the distribution element 26. The branching lines 27, 28, 29 bend outwardly in a radial direction at their lowermost ends, emptying out on the corresponding carrying floors 11, 12, 13. The distribution element 26 incorporates a distribution unit that makes it possible to selectively pass grains over the corresponding branching lines 27, 28, 29, thereby loading the carrying floors with grain. Located over these carrying floors 11, 12, 13 is a stripper extending in a radial direction. Visible on FIG. 1 are the strippers 30, 31 over the carrying floors 12, 13.

A suitable drive for rotating both the carrying floor 11, 12, 13 and the accompanying strippers 30, 31 makes it possible to provide the corresponding carrying floor 11, 12, 13 with a grain layer having a uniform thickness. Taking into account that the inner diameter of the carrying floors 11, 12, 13 measures 12 meters, and the outer diameter measures 32 meters, while a typical height of the grain layer on a carrying floor measures 1.2-1.4 meters, the weight of the grain layer carried by a carrying floor 11, 12, 13 measures approx. 440,000 kg (initial product). The bottom sides of the carrying floors 11, 12, 13 are therefore constructed with radial support beams so that this enormous weight can be carried.

In order to slowly germinate the grain on the carrying floor 11, 12, 13 that is moistened before transported to the carrying floor 11, 12, 13, it is necessary to treat the grain with conditioned air, during which enzymes break open the cell walls in the grain seeds, so that the starch in the grain seeds becomes accessible. This germination process is terminated within the tower 2 in a timely fashion to prevent the grain seeds from actually growing into a plant. To terminate this germination process, the grain seeds are dried in another system. This drying process is also referred to as kilning.

As evident from FIG. 1, the end of each stripper 30, 31 on the outside of the tower 2 (and 3) has a discharge opening that adjoins a perpendicular down pipe 32, whose open bottom side empties over a transport belt with which the germinated grain can be routed to a dryer below in the tower 2. It takes about 6 days to germinate the grain, while the drying process only takes about 1 day.

In order to process the grain on the carrying floors 11, 12, 13, the tower 2 has separate devices for each carrying floor 11, 12, 13, both for displacing air along the corresponding grain layers, and for conditioning this air. Typical conditions for conditioning this air are 12-18° C. and an atmospheric humidity of 40-100%. In addition, a $CO_2$ percentage of about 2% can be used, depending on how far the germinating process has progressed.

The function of the device for grains on the lowermost carrying floor 11 will be explained below. Situated under the tier floor 7 is a fan with an aspiration opening 33 and an exiting blast outlet 34. This blast outlet 34 empties under the lowermost end of the canal 16. A horizontal separating wall not shown in greater detail is situated in the canal 16 at the level of the carrying floor 11. Situated between the tier floor 7 and carrying floor 11 inside the canal is an outflow opening 35 on the outside of the cylindrical space 14. Conditioned air routed to the fan 32 passes through this outflow opening 35 and into the annular space 36 between the tier floor 7 and carrying floor 11. Because overpressure prevails in this space 36, while a low overpressure is present in the annular space 37 between the carrying floor 11 and tier floor 8, the conditioned air streams through the permeable carrying floor 11 and the grain layer carried by the carrying floor 11. Air inside the annular space 37 exits this space 37 again via the flow-through opening 38 on the outside of the cylindrical space 14, which borders the canal 15 and is located between the level of the carrying floor 11 and tier floor 8. Situated both above and below the opening 38 inside the canal 15 is a valve, which makes it possible to regulate what percentage of air flows through the opening 38 and is upwardly diverted into the canal 15, so as to leave the tower 2 or become downwardly diverted according to arrow 39. This portion of air is intended for recirculation, and is aspirated by the fan 32.

The bottom end of the canal 15 empties in an underpressure chamber 40 with an outflow opening to the suction chamber 42 with the aspiration opening 33 located therein. The suction chamber 42 can also be reached by ambient air according to arrow 43, to which end a suitable opening (not shown in any greater detail) is of course provided in the outer wall of the tower 2. The ratio between recirculated air (arrow 39) and outside air (arrow 43) aspirated by the fan can be determined by setting the revolving door valve 44, which can be turned around a rotational axis 45. This revolving door valve 44 also makes it possible to completely seal the underpressure chamber 40, wherein the fan 32 aspirates outside air only (arrow 43), and to avoid outside air (arrow 43) from being aspirated, and prevent the fan 32 from aspirating only air that has already traversed the grain layer on the carrying floor 11 at least once (arrow 39). FIG. 2 does not show the air conditioning element, such as cooling blocks, used to bring the air to the correct temperature, and atomizers for bringing the air to the correct humidity, but could be located in the suction chamber 42 or blast outlet 34, for example.

The grain layer is treated on the carrying floor 12 in a completely comparable manner. A fan 46 blows air from the bottom side into the canal 20, wherein the air passes the outflow opening 46 to arrive at the annular space 47 between the tier floor 8 and carrying floor 12. The air then traverses the carrying floor 12 and the grain layer lying thereupon, after which the air exits the annular space 48 between the carrying floor 12 and tier floor 9 again through the outflow opening 49. Depending on the states of the various suitable valve, the air is then upwardly diverted to exit the tower 2 via the upper end of the canal 21, or downwardly diverted (according to arrow 50) owing to the aspirating effect of the fan 46.

Comparable arrangements are also provided for the grain layer 24 on the carrying floor 13, wherein conditioned air is passed via the bottom side of the canal 18 to the grain layer 24, and air that has passed the grain layer 24 is either expelled outside the tower 2 via the canal 17, or relayed back to the fan belonging to the floor 13.

The described malt factory offers the advantage of expanded and economic performance due to the relatively large inner diameter of the carrying floors 11, 12, 13, in that the cylindrical space 14 is used to accommodate necessary lines for supplying and removing conditioned air to and from a grain layer. The cylindrical space 14 is also used for supplying grain to the corresponding carrying floors 11, 12, 13. In addition, the seventh canal 17 is used to remove and supply water, energy (electricity) and air or compressed air.

The invention claimed is:

1. A device for malting grains comprising:
a tower with a plurality of stories delineated by story floors;
air-permeable annular supporting floors associated with each story being structured and arranged to support grain to be germinated;
a central cylindrical space at an inner diameter of the annular supporting floors in which perpendicular channels extending over an entire height of the stories are arranged, the cylindrical space being divided to define the channels as segmented cross-sections that are separated from each other by radial intermediate walls;
air flow paths associated with the plurality of stories comprising supply channels, displacement elements, and discharge channels, wherein an air flow path for a respective story comprises air flow through a respective supply channel, through respective displacement elements and a respective supporting floor and its associated grain, and through a respective discharge channel, whereas each of the perpendicular channels is allocated to a respective supply channel or a respective discharge channel, and both the supply channels and discharge channels extend within the central cylindrical space; and
each story comprises:
an outflow opening allowing an air flow path from a respective supply channel to a respective floor and its associated grain; and
a flow-through opening allowing an air flow path to a respective discharge channel.

2. The device in accordance with claim 1, further comprising air conditioning elements for conditioning air to be supplied to the grain.

3. The device in accordance with claim 1, wherein the discharge channel empties at least one of into an underpressure chamber and through an opening into an outside environment.

4. The device in accordance with claim 1, wherein the respective supply channel and the respective discharge channel are arranged to abut each other as they extend through the central floor opening.

5. The device in accordance with claim 4, wherein the central floor opening is circular.

6. The device in accordance with claim 4, wherein the at least one central floor opening is at least 10 meters in diameter.

7. The device in accordance with claim 6, wherein the at least one central floor opening is at least 12 meters in diameter.

8. The device in accordance with claim 1, wherein each annular supporting floor has an interior diameter of at least 10 meters.

9. The device in accordance with claim 8, wherein the interior diameter for each supporting floor is at least 12 meters.

10. The device in accordance with claim 8, wherein the supporting floor has a radial span of at least 7 meters between the interior diameter and an exterior diameter.

11. The device in accordance with claim 8, wherein the supporting floor is rotatable around a rotational axis extending through a central axis of the annular shape.

12. The device in accordance with claim 1, further comprising air conditioning elements located below a lowermost supporting floor for the grain to be germinated.

13. The device in accordance with claim 1, further comprising air conditioning elements located above an uppermost supporting floor for the grain to be germinated.

14. The device in accordance with claim 1, further comprising air conditioning elements located within an outer periphery of the story floors for the grain to be germinated.

15. The device in accordance with claim 1, further comprising another supporting floor arranged to support germinated grain to be dried and located below a lowermost supporting floor to support the grain to be germinated.

16. The device in accordance with claim 15, wherein the another supporting floor to support the germinated grain to be dried has dimensions similar to those of the supporting floors to support the grain to be germinated.

17. The device in accordance with claim 1, wherein the supporting floors are air permeable.

18. The device in accordance with claim 1, wherein the supporting floors are perforated.

19. A method for malting grains in a tower with a plurality of stories delineated by story floors, comprising:
arranging grain to be germinated on a respective air-permeable supporting floor associated with at least one of the plurality of stories, wherein the supporting floor of each of the plurality of stories includes a central opening;
guiding air through at least one of a plurality of channels arranged within the central openings as a flow path associated with the at least one of the plurality of stories, the flow path extending through a supply channel, through displacement elements, through the respective supporting floor and its associated grain, and through at least one other of the plurality of channels within the central openings as a discharge path, wherein the plurality of channels are defined as segmented cross-sections separated from each other by radial intermediate walls; and
guiding the air in the at least one supply channel and in the at least one discharge channel through the central openings arranged within the plurality of stories.

20. A device for malting grains comprising:
a tower with a plurality of stories delineated by story floors;
air-permeable supporting floors associated with each story being structured and arranged to support grain to be germinated;
at least one supply channel;
at least one discharge channel;
displacement elements arranged between the at least one supply channel and the at least one discharge channel;
an air flow generator structured and arranged to generate an air flow path through the at least one supply channel, through at least one outflow opening located below at least one of the air-permeable supporting floors, through the at least one of the air-permeable supporting floors and the grain supported thereon, through at least one flow-through opening arranged above the at least one of the air-permeable supporting floors, and through the at least one discharge channel; and
at least one central opening within at least one story, through which the at least one supply channel and the at least one discharge channel extend, wherein the at least one supply channel and the at least one discharge channel are defined by radial intermediate walls as separate segmented cross-sections within the at least one central opening.

* * * * *